Patented Jan. 17, 1928.

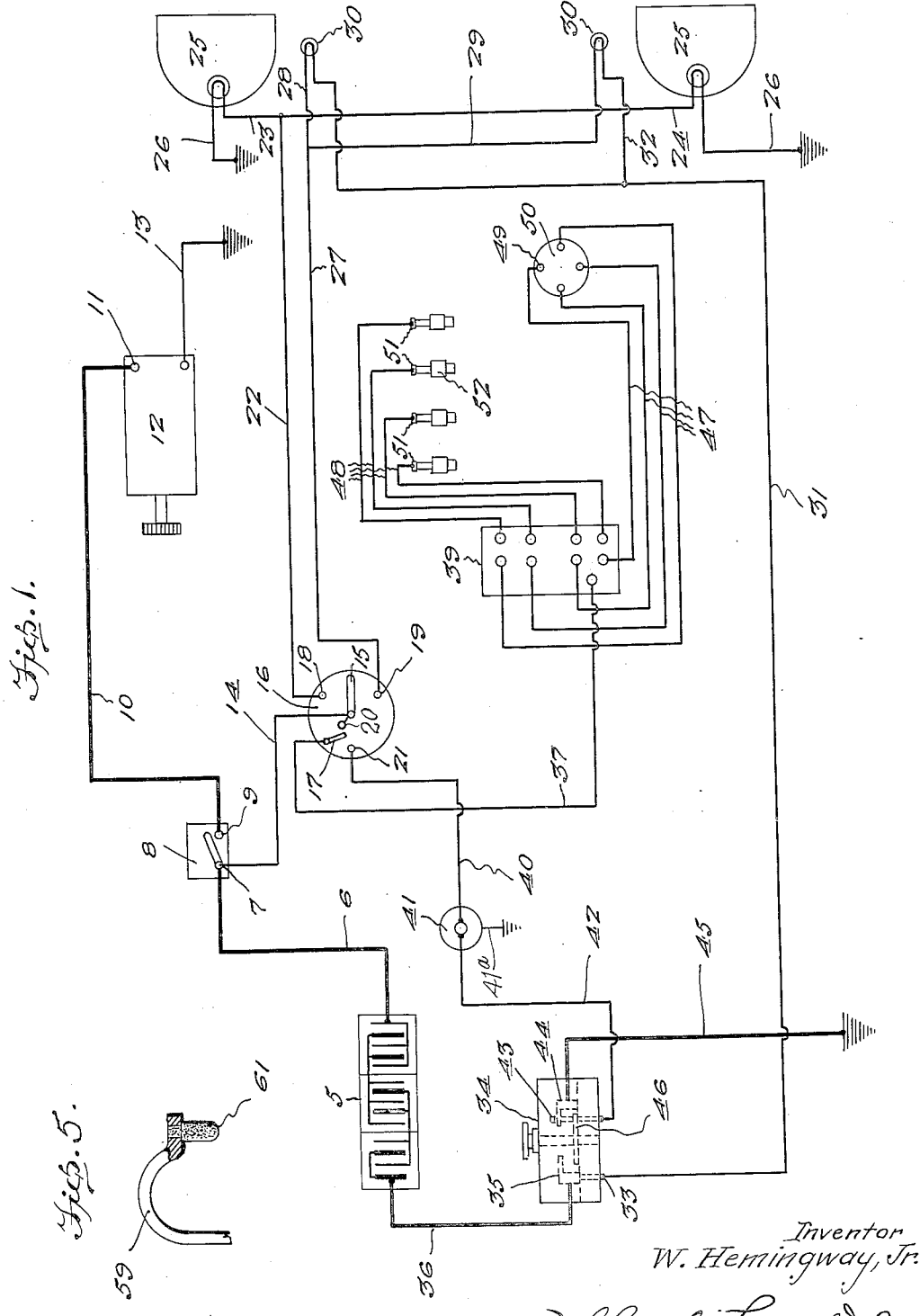

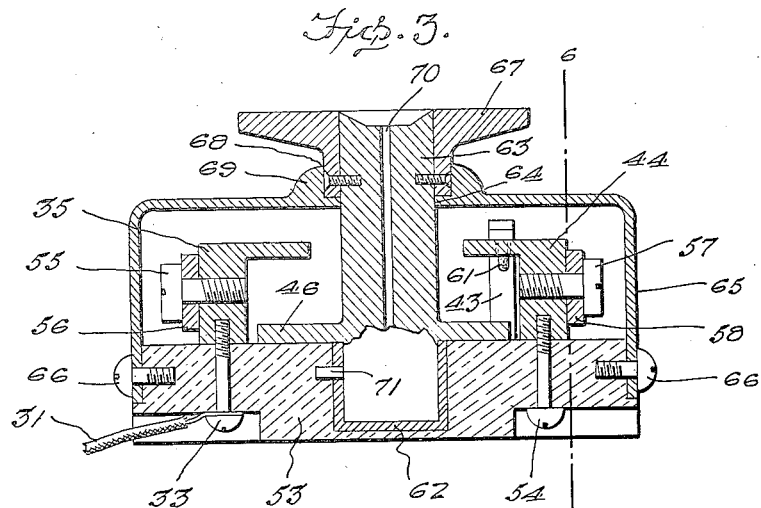
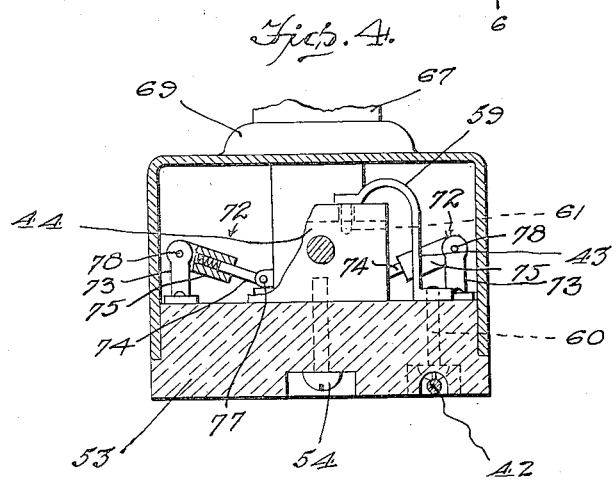
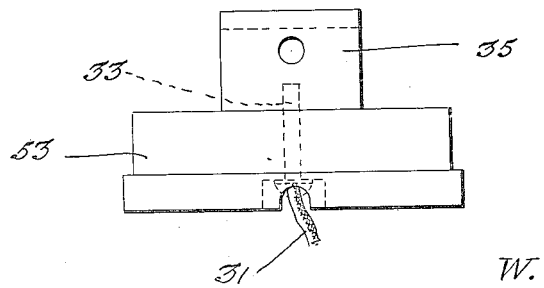

1,656,584

UNITED STATES PATENT OFFICE.

WILSON HEMINGWAY, JR., OF VICKSBURG, MISSISSIPPI, ASSIGNOR TO THE ELECTROLOCK MANUFACTURING COMPANY, OF VICKSBURG, MISSISSIPPI, A CORPORATION OF MISSISSIPPI.

ELECTRIC SWITCH LOCK FOR AUTOMOTIVE VEHICLES.

Application filed June 6, 1922. Serial No. 566,429.

My invention relates to certain improvements in systems of electrical distribution as employed in automobiles, motor boats, and the like, but resides more particularly in the provision of a novel form of switch and in the manner in which the switch is embodied in the aforementioned systems.

One of the principal objects of the invention is to provide means whereby the wiring and electrical devices on an automobile, motor boat or the like may be instantly protected from the injurious effects of grounds or short circuits without removing or cutting the storage battery lead or leads as is now required.

A further object of the invention is to utilize the aforementioned protecting means in combination with a lock structure to prevent unauthorized use of all or certain of the electrical devices.

A still further object of the invention resides in accomplishing the aforementioned protection of the wiring and electrical devices by the provision of a switch and the establishment, through the said switch, of a ground connection from the one terminal of a storage battery or other source of supply to the wiring and various electrical devices to which the storage battery or other current is supplied.

Other objects and advantages of the invention will appear from the following description, taken in connection with the accompanying drawing, in which Fig. 1 is a diagrammatic view of a system of electrical distribution including and modified in accordance with my invention.

Fig. 2 is an end view of the switch base and one of the contacts mounted thereon.

Fig. 3 is a view showing the switch in longitudinal section.

Fig. 4 is a view showing the switch in transverse section, certain parts being omitted for the sake of clearness.

Fig. 5 is a view of a detail.

My invention consists essentially in the insertion of a suitable switch in the lead ordinarily employed on automobiles and motor boats for grounding one terminal of the storage battery to the various circuits and electrical devices receiving current therefrom. This switch and the leads connecting it to the storage battery terminal and to the ground are designed to carry the full current delivered by the storage battery without offering sufficient resistance to cause an appreciable drop in the voltage. The switch is preferably provided with means for locking it in the open position so that the devices contained in the various circuits grounded to the switch may be adequately protected against unauthorized use. When a magneto is used to alternate with or to replace the storage battery for supplying current to the ignition system suitable provision is made in the switch for automatically short circuiting the magneto by movement of the switch to open position the arrangement being such that the short circuit through the switch is automatically disrupted upon movement of the switch to closed position. It will be understood that the alternate use of the storage battery and magneto for supplying current to the ignition system is controlled, in the usual manner independently of the switch mentioned, and that the said switch merely serves, in locked position, to prevent unauthorized use of both the storage battery and the magneto. Due to its particular location in the ground connection, opening the switch will have the effect of preventing the discharge of any storage battery current to the various electrical devices which are grounded to the switch and will thus effectually guard such devices against injury, such as ordinarily occurs as the result of grounds or short circuits.

Referring to the diagram shown in Fig. 1, of the drawings, 5 designates a storage battery having one terminal connected by the usual heavy lead 6, to a contact 7 on the starter switch 8. The remaining contact 9 of the starter switch is, in turn, connected by lead 10 to the terminal 11 of the starter 12, the terminal 13 of which is grounded in the usual manner.

A lead 14 is extended from the contact 7 to a movable contact 15 on the distributor 16. This distributor is provided, in the present instance, with a second movable contact 17 and with a plurality of stationary contacts designated respectively, by the numerals 18, 19, 20 and 21.

The contact 18 is connected by leads 22, 23 and 24, to one terminal of each of the headlight lamps 25, the remaining terminals of the lamps being grounded in the usual manner, as indicated at 26. The contact 19 is connected by leads 27, 28 and 29 to one terminal of each of the dimmer lamps 30, the remaining terminals of said lamps being connected by leads 31 and 32 to the contact screw 33 of a switch 34. The contact screw 33 is extended through the base of the switch 34 into threaded engagement with a contact 35 connected, by a lead 36, to the ground terminal of the battery 5, so that the dimmer circuit may be maintained irrespective of whether the switch 34 is open or closed.

The distributor contact 17 is suitably connected by lead 37 to the coil box 39, while the distributing contact 21 is connected by lead 40 to the insulated terminal of the magneto 41, the other terminal of which is grounded as indicated at 41ª. The insulated terminal of said magneto is also connected by a tap 42 extending to a spring contact 43 normally engaging the grounded contact 44 of the switch 34 when in open position, the contact 44 being connected to the ground by a suitable lead 45. It will be understood that the contacts 35 and 44 of the switch 34 are suitably insulated from one another and are connected, in the closed position of the switch, through the medium of a movable contact 46 so as to establish a ground connection for the one terminal of the storage battery 5.

The remaining contact 20 of distributing switch 16 is connected to lead 14 and is so located with reference to contacts 17 and 21 as to enable contact 17 to be shifted into engagement with either of said contacts 20 or 21 to supply lead 37 with current from the battery or magneto, as desired.

Suitable leads 47 and 48 are provided for properly connecting the stationary contacts 49 of the timer 50 and the insulated electrodes 51 of the spark plugs 52 to the coil box 39, it being understood that the rotor of the timer and the remaining electrodes of the plug are grounded in the usual way.

Referring now to the remaining figures of the drawing, for a clearer understanding of the switch 34, which constitutes an important element in the present invention, 53 designates a base of insulating material having the aforementioned contacts 35 and 44 mounted thereon and secured in place by the screws 33 and 54 passing upwardly through the base into threaded engagement with said contacts.

As previously mentioned, the contact screw 33 has the return lead 31 of the dimmer lamps connected thereto while the contact 35 is provided with a binding screw 55 for securing thereto the terminal 56 of the lead 36 extending from the ground terminal of the storage battery.

The contact 44 is provided with a binding screw 57 for securing thereto the terminal 58 of the grounded lead 45. This contact 44 is normally engaged by the upper overlying end 59 of the spring contact 43 which is held to the base by a screw 60 to which is connected the tap 42 from the magneto 41. The said upper end 59 of the contact element 43 is provided with an insulating tip 61 depending downwardly through an opening formed in the upper portion of the contact 44.

Embedded in the central portion of the base 53 is a socket 62 adapted to receive therein the lower end of a barrel 63 mounted to slide vertically through an opening 64 formed in the top of a cover or casing 65 secured to the base 53 through the medium of screws 66. At its upper end this barrel is equipped with an operating knob or handle 67, held thereto by screw 68 arranged to be concealed, in the lowered position of the barrel, by a flange 69 formed on the cover or casing around the opening 64.

The barrel 63 is formed with a key slot 70 and contains, in the lower end thereof, any suitable form of lock mechanism including a bolt 71 adapted to be projected through an opening formed in the socket 62 so as to lock the barrel in lowered position.

Adjacent its lower end the barrel 63 carries the contact 46 which, in the vertical movement of the barrel, engages and disengages the contacts 35 and 44 to close and open the switch. In the engaged position of the contacts 35, 44 and 46, it will be evident, upon referring to the diagram shown in Fig. 1, that connection is established between the ground pole of the storage battery 5 and the ground wire 45 to permit the circuits to the starter 12, lamps 25 and the ignition devices to be closed at will through the medium of the switch 8 and distributor 16. It will be equally obvious that, upon disengagement of the contact 46 with the contacts 35 and 44, no current will flow to the starter, headlight lamps or ignition devices and consequently it will be seen that the opening of this switch upon the developments of grounds or short circuits will adequately protect the starter, headlight lamps and ignition devices from being damaged as now frequently occurs.

When the switch is locked in the open position with the contact 46 disposed as shown in the drawing, it will be apparent that the insulated terminal of the magneto 41 is grounded through lead 42, screw 60, contacts 43 and 44, and lead 45 so that unauthorized use of the magneto is effectually prevented. Movement of the contact 46 into engagement with contacts 35 and 44 will cause it to engage the insulating tip 61 and thus break the connection between the contacts 43 and 44 to permit of the magneto being used in the usual manner.

In order to effectually hold the movable contact 46 in either of the two positions to which it may be moved, I provide a pair of spring devices 72 pivoted at one end to opposite sides of the barrel 63 and at the opposite end to suitable brackets 73 mounted on the base. Each of the said spring devices preferably comprises telescoping rods 74 and 75, and a spring 76 mounted in compression, between them. The rods 74 of the two devices are pivoted, as at 77, to the barrel 63 while the rods 75 are pivoted, at 78, to the brackets 73. It will be noted, in this connection, that the pivot points 78 of the spring devices are located approximately midway of the two positions to which the pivots 77 are movable, so that the spring devices will be equally effective in either position of the plate 46.

While the operation is fairly obvious from the foregoing, it is thought that the following brief review will be conducive to a more thorough understanding of the advantages attained.

Normally the contact element 46 is engaged with the contacts 35 and 44, so that the one terminal of the battery 5 is grounded through the leads 36 and 45 to the starter 12, headlight lamps 25, plugs 52 and timer 50, so that these devices may be brought into use in the usual manner through the medium of the starter and distributor switches 8 and 16 which form no part of the present invention in so far as particular construction is concerned and may therefore be of any standard or preferred design. In this closed position of the switch 34, it will be obvious that the ground connection 42 leading from the magneto 41 will be open so that the said magneto may, through the medium of the distributor 16, be substituted for the storage battery as the source of current supply for the ignition system. The ordinary systems of electrical distribution for automobiles, motor boats and the like do not include any element equivalent to the switch 34, and consequently in order to protect the various circuits and electrical devices from the injurious effects of grounds or short circuits it is necessary to disconnect or cut the leads fastened to the terminals of the storage battery 5. With my invention, the same result is attained in a more desirable and efficient manner by simply opening the switch 34 to disengage the contact 46 from the contacts 35 and 44, so that the ground connection from the storage battery to the various circuits and electrical devices is broken in such manner as to immediately stop the flow of current to the latter.

My invention is of further advantage in that the locking of the contact 46 out of engagement with the contacts 35 and 44 will effectually prevent the use of the magneto, starter, lamps and other electrical devices grounded to the said switch and without interfering with the circuit including the dimmers 30 as this circuit is permanently established through the switch 34 by the lead 31 contacts 33 and 35 and the lead 36.

Having thus fully described my invention, what I claim as new is:

1. A system of electrical distribution comprising a storage battery, starter, headlight lamp, and ignition circuits, means for establishing lead-connection between said circuits and the one terminal of the storage battery, a switch having one contact grounded to said circuits and a second contact lead-connected to the other terminal of the storage battery, a dimmer circuit having one terminal adapted to be lead-connected to the insulated terminal of the storage battery, the remaining terminal of the dimmer circuit being lead-connected to the second mentioned switch contact to permit said circuit to remain unaffected by opening and closing of the switch, a magneto circuit having one terminal grounded, means for connecting the remaining terminal of the magneto circuit to the ignition circuit, a tap from the last mentioned terminal of the magneto circuit to an additional contact on the switch normally engaged with the aforementioned grounded contact to effect short circuiting of the magneto and means coacting with the switch contacts to make and break the ground connection to the storage battery and the tap connection to the magneto circuit.

2. A system of electrical distribution including a circuit a battery and a magneto affording alternate sources of current supply for said circuit, means for establishing a lead-connection between one terminal of the battery and one terminal of the circuit, the other terminal of the battery and one terminal of the magneto being grounded to the circuit, means for establishing a lead-connection between the insulated terminal of the magneto and one terminal of the said circuit, and a switch included in the ground connection of the battery for making and breaking the same and having provision for grounding the insulated terminal of the magneto when said switch is in the open position.

3. A system of electrical distribution including a circuit, a battery and a magneto affording alternate sources of current supply for said circuit, means for establishing a lead-connection between one terminal of the circuit and one terminal each of the battery and magneto, a switch having a grounded main contact and a second main contact lead connected to the remaining terminal of the battery, a main movable contact engageable with said stationary contacts in the closed position of the switch to establish a ground connection to the battery and means serving, in the open position of said switch, to establish a tap connection between the insulated terminal of the magneto and the aforesaid grounded contact.

4. The arrangement recited in claim 3 in which the last mentioned means includes a spring contact normally engaging the grounded switch contact and lead connected to the insulated terminal of the magneto and a non-conducting member carried by said spring contact and arranged to be engaged and moved by the movable contact of the switch when the latter is shifted into engagement with the stationary switch contacts, the arrangement being such that the spring contact is disengaged with the grounded switch contact in the closed position of the switch so as to disrupt the tap connection to the insulated terminal of the magneto.

In testimony whereof I hereunto affix my signature.

WILSON HEMINGWAY, Jr.